United States Patent
Baek et al.

(10) Patent No.: US 7,830,763 B2
(45) Date of Patent: Nov. 9, 2010

(54) OPTICAL RECORDING MEDIUM, RECORDING/REPRODUCING APPARATUS PROVIDED WITH OPTIMUM POWER CONTROL (OPC) AND METHOD FOR CONTROLLING THE SAME

(75) Inventors: Ji Seon Baek, Suwon-si (KR); Jin Woo Yu, Suwon-si (KR); Otsuka Tatsuhiro, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 894 days.

(21) Appl. No.: 11/362,714

(22) Filed: Feb. 28, 2006

(65) Prior Publication Data

US 2007/0002706 A1    Jan. 4, 2007

(30) Foreign Application Priority Data

Jul. 4, 2005   (KR) .......................... 10-2005-59729

(51) Int. Cl.
   *G11B 7/00*   (2006.01)
(52) U.S. Cl. ................................. 369/47.53
(58) Field of Classification Search ........................ None
   See application file for complete search history.

(56) References Cited

U.S. PATENT DOCUMENTS

| | | | | |
|---|---|---|---|---|
| 2002/0085462 A1* | 7/2002 | Spruit | ..................... | 369/47.53 |
| 2003/0133378 A1* | 7/2003 | Kawashima et al. | ..... | 369/47.53 |
| 2003/0185118 A1* | 10/2003 | Takeda | ..................... | 369/47.39 |
| 2004/0125720 A1* | 7/2004 | Ando et al. | ............. | 369/47.53 |
| 2005/0030861 A1* | 2/2005 | Matsui et al. | ............ | 369/47.53 |
| 2005/0128911 A1* | 6/2005 | Miyashita et al. | ........ | 369/47.53 |

FOREIGN PATENT DOCUMENTS

JP      11-39803      2/1999

* cited by examiner

*Primary Examiner*—Peter Vincent Agustin
*Assistant Examiner*—Emily Frank
(74) *Attorney, Agent, or Firm*—Stanzione & Kim LLP

(57) ABSTRACT

An optical disc apparatus is provided with optimum power control (OPC) to determine an optimum laser power needed for recording data on an optical disc. Such an apparatus comprises a controller to determine optimum writing power in such a way of re-establishing a new test zone when an erasing error is detected on an initially established test zone in order to perform the OPC. When the erasing error is detected on a test zone of an OPC zone, a new test zone is re-established, so that OPC is performed rapidly while reducing an error frequency occurring when optimum writing power is not determined.

31 Claims, 10 Drawing Sheets

OPTICAL RECORDING MEDIUM, RECORDING/REPRODUCING APPARATUS PROVIDED WITH OPTIMUM POWER CONTROL (OPC) AND METHOD FOR CONTROLLING THE SAME

CROSS-REFERENCE TO RELATED APPLICATIONS

This application claims the benefit under 35 USC §119 of Korean Patent Application No. 2005-59729, filed on Jul. 4, 2005 in the Korean Intellectual Property Office, the disclosure of which is incorporated by reference herein.

BACKGROUND OF THE INVENTION

1. Field of the Invention

The present invention relates to optical recording media, such as optical discs, and more particularly, relates to an optical disc apparatus for recording/reproducing data on/from an optical disc provided with optimum power control (OPC), and a method for controlling the same.

2. Related Art

Recording media such as optical discs have been developed and commercialized to record and store image data and sound data with improved performance for a long period of time. Such optical disks can be classified as either compact disks (CDs) or digital versatile disks (DVD) according to data recording capacity. Examples of optical disks that can be recorded, deleted, and reproduced include 650 MB CD-Rs, CD-rewritables (RWs), 4.7 GB DVD+R/RWs, DVD-random access memories (RAMs), and DVD-R/RWs. Examples of optical disks that are dedicated for data reproduction include 650 MB CDs and 4.7 GB DVD-read only memories (ROMs). In addition, due to limitations in increasing storage capacity of the conventional DVD-ROM, standardization for new high-density optical discs, for example, rewritable blue-ray (BD) disc, has been rapidly advanced.

When data is recorded on a high-density optical disc, an optimum power control (OPC) process is performed to determine an optimum writing power for recording data on an associated optical disc, i.e., the best recording laser power setting for each optical disc and a recording/reproducing apparatus combination. Typically, a test zone is provided for the OPC process. Usually, a predetermined zone of the optical disc must be selected and erased to provide a test zone for the OPC process, and erasing-error detection must then be performed on the test zone to detect whether a record is completely erased from the test zone or whether defects exist in the erased test zone.

Conventionally, if a record is not erased, or a defect is still present in the test zone, the process of erasing the test zone and of detecting the non-erased record or defect in the test zone must be repeated until the test zone is free from any record or defect.

However, such an erasing process can take a significant amount of time. Moreover, if an error occurs due to serious defects such as contaminants or physical damage of the test zone on the optical disc, such defects cannot be eliminated. As a result, even if the test zone erasing process is repeated on the same test zone, there is no way to secure a test zone that is free from any record or defect. Furthermore, since the optimum amount of laser power needed to record data on an optical disc is determined based on the condition that the test zone is incompletely erased, there is an increased error frequency resulting in failure to determine the optimum laser power.

SUMMARY OF THE INVENTION

Various aspects and example embodiments of the present invention advantageously provide an optical disc recording/reproducing apparatus for optimum power control (OPC), designed to re-establish a new test zone for OPC when an erasing error is detected in an initially established test zone for OPC, such that OPC can be performed quickly while reducing an error frequency.

Additional aspects and/or advantages of the invention will be set forth in part in the description which follows and, in part, will be obvious from the description, or may be learned by practice of the invention.

In accordance with an aspect of the present invention, an optical disc apparatus is provided for performing optimum power control (OPC) to determine an optimum laser power suitable for recording data on an optical disc. Such an apparatus comprises: an optical pickup to irradiate a laser beam onto an optical disc for recording and reproducing data; and a controller arranged to control the optical pickup, for performing optimum power control (OPC) to determine an optimum laser power suitable for recording data on the optical disc, wherein the controller is configured to re-establish a test zone when an erasing error is detected on an initially established test zone in order to perform the OPC on the optical disc.

The controller may re-establish the test zone on an area excluding the initially established test zone where the erasing error has been detected.

When an OPC zone is provided in a lead-in area of the optical disc, the controller may re-establish the test zone in the OPC zone.

The test zone may comprise a plurality of blocks, and the controller may re-establish the test zone after skipping a predetermined number of blocks from a block where the erasing error has been detected in the initially established test zone. The predetermined number of blocks may be one.

The test zone may comprise a plurality of blocks, and the controller may prevent blocks of a re-established test zone from overlapping with blocks of an initially established test zone.

The controller may repeat re-establishment of the test zone until the erasing error is no longer detected.

In accordance with another aspect of the present invention, a method is provided to control an optical disc apparatus capable of performing OPC to determine optimum writing power suitable for an optical disc. Such a method comprises: initially establishing a test zone for performing the OPC on the optical disc; erasing the initially established test zone; detecting whether an erasing error is present in the initially established test zone; if the erasing error is present in the initially established test zone, re-establishing a test zone; erasing the re-established test zone; and if the erasing error is not present in the re-established test zone, determining the optimum writing power of the optical disc on the basis of a result of reading a specific pattern written on the re-established test zone.

Re-establishing of the test zone may comprise excluding the initially established test zone where the erasing error has been detected.

Re-establishing of the test zone may comprise re-establishing the test zone after skipping a predetermined number of blocks from a block where the erasing error has been detected in the initially established test zone.

Re-establishing of the test zone may be performed to prevent a block of the re-established test zone from overlapping with a block of the initially established test zone.

Re-establishing of the test zone may comprise repeating re-establishment of the test zone until the erasing error is no longer detected in either the initially established test zone or the re-established test zone.

In accordance with yet another aspect of the present invention, an optical disc apparatus comprises an optical pickup to irradiate a laser beam onto an optical disc for recording and reproducing data; a memory to store parameters to perform optimum power control (OPC); and a controller arranged to control the optical pickup and to access the memory for performing optimum power control (OPC), wherein the controller is configured to: initially establish a test zone for performing the OPC on the optical disc; erase the initially established test zone; determine whether an erasing error exists on the initially established test zone, and if the erasing error exists on the initially established test zone, re-establish a test zone; erase the re-established test zone; and if the erasing error does not exist on the re-established test zone, record a specific OPC pattern on the re-established test zone on the optical disc for subsequent determining of an optimum laser power suitable for recording data on the optical disc.

When an OPC zone is provided in a lead-in area of the optical disc, the controller establishes the initially established test zone and the re-established test zone in the OPC zone. When test zone is provided with a plurality of blocks, and the controller re-establishes a test zone after skipping a predetermined number of blocks from a block where the erasing error has been detected on the initially established test zone. Alternatively, the controller re-establishes a test zone at a new cycle of blocks after skipping the remainder of blocks of a previous cycle of blocks where the erasing error is detected in the initially established test zone. Such a re-establishment of the test zone can be repeated until the erasing error is no longer detected on either the initially established test zone or the re-established test zone.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the invention are limited only by the terms of the appended claims. The following represents brief descriptions of the drawings, wherein:

DETAILED DESCRIPTION OF THE EMBODIMENTS

Figure 1:
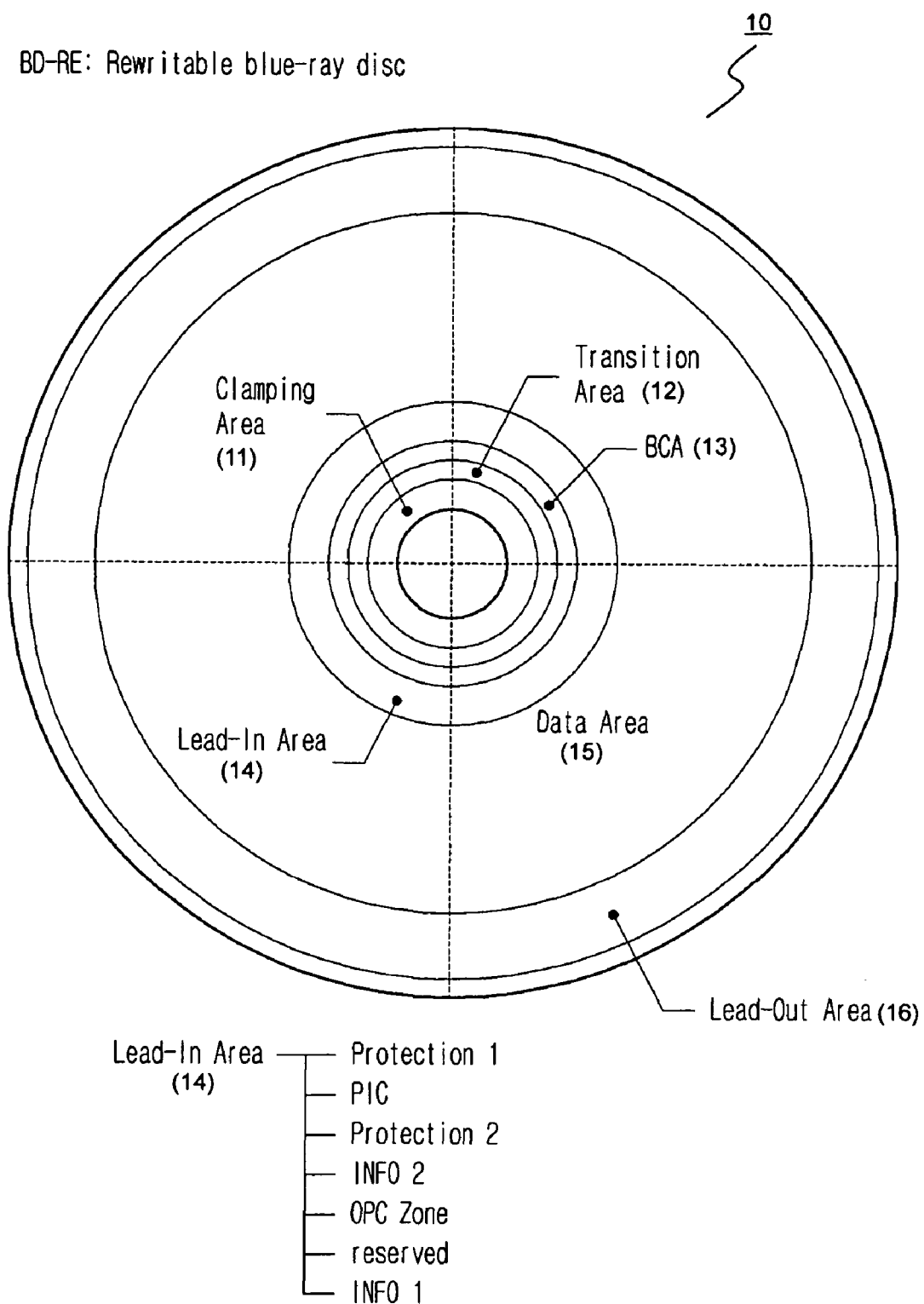
FIG. 1 is a top view illustrating a track structure of an optical disc according to an embodiment of the present invention.

Reference will now be made in detail to the embodiments of the present invention, examples of which are illustrated in the accompanying drawings, wherein like reference numerals refer to like elements throughout the drawings. The embodiments are described below to explain the present invention by referring to the figures.

As shown in FIG. 1, a high-density optical disc 10, such as, for example, a rewritable blue-ray disc (BD-RE), has a track structure in which a clamping area 11, a transition area 12, a burst cutting area (BCA) 13, and a lead-in area 14 are sequentially defined on an inner periphery of the optical disc, a data area 15 is defined on an intermediate area of the optical disc 10, and a lead-out area 16 is defined on an outer periphery of the optical disc 10.

The lead-in area 14 is partitioned into a first protection zone (Protection 1), a permanent information amp control data (PIC) zone, a second protection zone (Protection 2), a second information section (INFO 2), an optimum power control zone, a reserved zone, and a first information section (INFO 1). The first protection zone and the PIC zone are zones with data previously written therein, whereas the remainder of the lead-in area, the data area, and the lead-out area are rewritable areas where new data is rewritten.

The BCA 13 stores a variety of important information related to an optical disc 10, such as a serial number of a disc or code information to provide copy protection of the optical disc 10, i.e., copy protection information. When an optical disc 10 is inserted and seated in an optical disc apparatus, the BCA 13 is accessed first among all areas on the optical disc 10.

The PIC area included in the lead-in area 14, stores general information related to the optical disc 10 to be preserved permanently, and is formed with a high frequency modulated groove.

Figure 2:
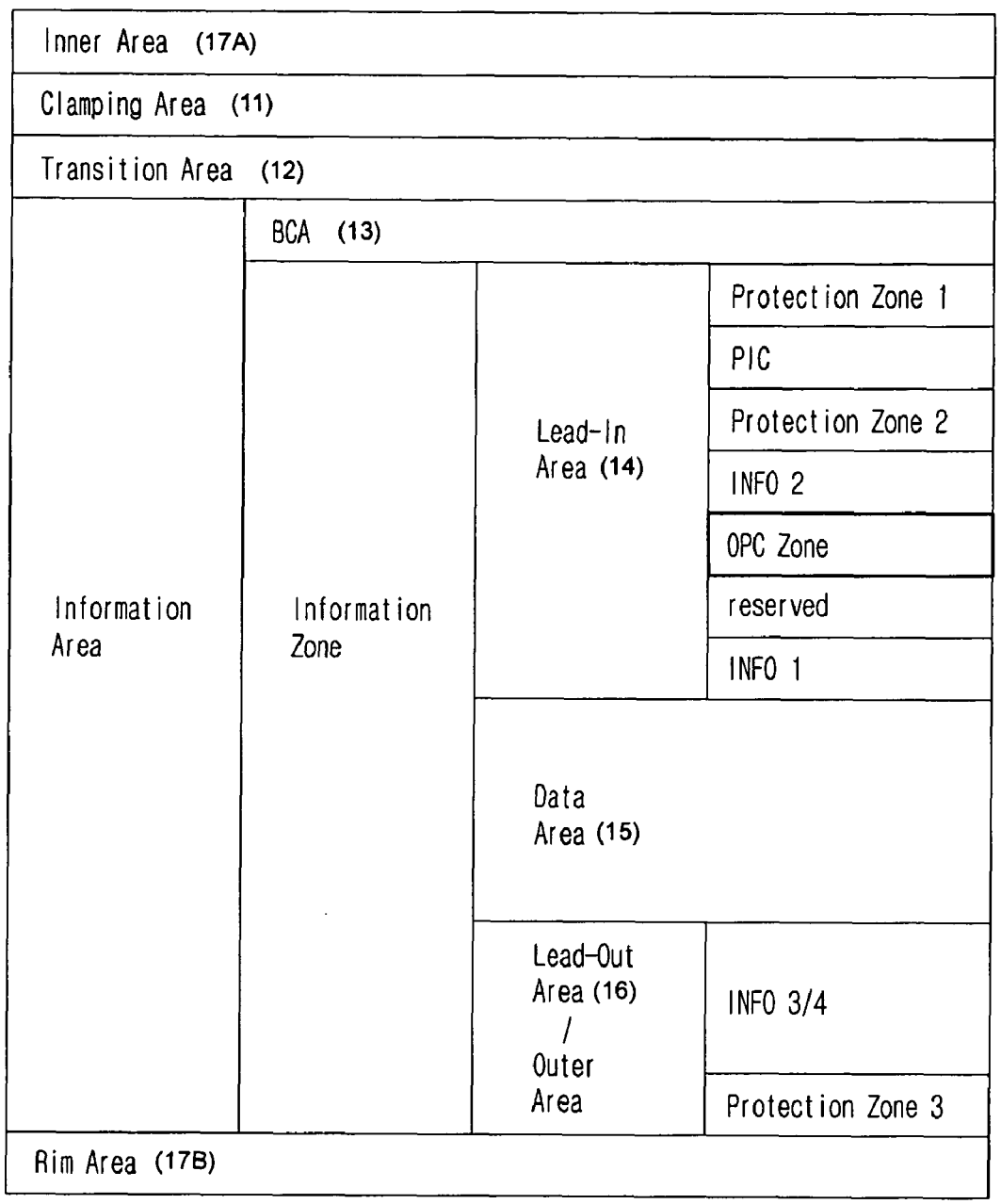
FIG. 2 is a top view illustrating the construction of an optical disc according to an embodiment of the present invention.

Turning now to FIG. 2, a general structure of an optical disc 10 according to an embodiment of the present invention is illustrated. In order to record data on the high-density optical disc 10 as shown in FIG. 2, optimum power control (OPC) must be performed to determine optimum writing power suitable for the optical disc 10. For this purpose, the OPC zone, used to determine suitable laser power for recording data on the optical disc 10, is located in the lead-in area 14 on the rewritable high-density optical disc 10. The OPC zone for performing OPC occupies a large area, such as 0X1bc00~0X1bc00 in PAA units. As a result, 30 seconds are typically needed to completely erase the OPC zone.

In order to secure a test zone for determining optimum writing power on such an OPC zone, an established test zone is erased, and then an erased zone is checked as to whether an erasing error is present in the erased zone.

The optical disc driving unit according to the invention performs OPC rapidly and accurately by detecting the erased zone, and re-establishing a test zone when the erasing error is detected in the erased zone.

Figure 3:
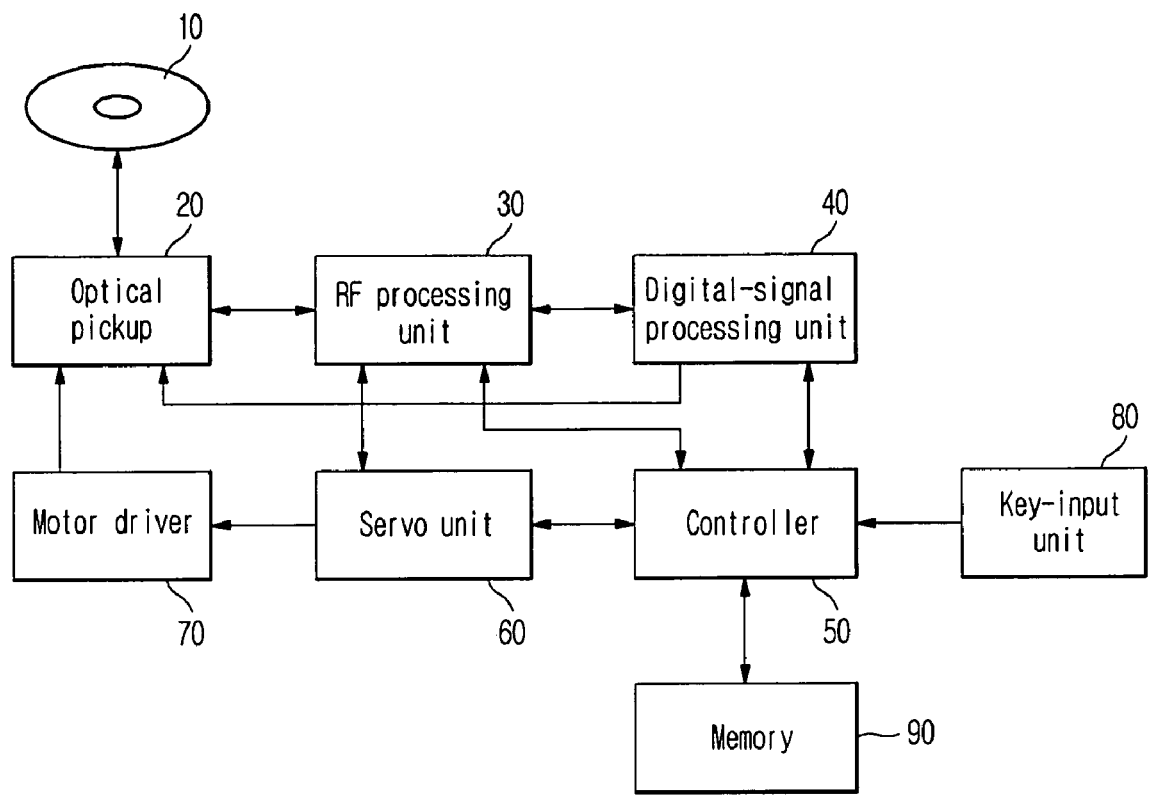
FIG. 3 is a block diagram illustrating an example optical disc apparatus for recording/reproducing data on/from an optical disc according to an embodiment of the present invention.

FIG. 3 illustrates an example optical disc apparatus for recording/reproducing data on/from a high-density optical disc according to an embodiment of the present invention. Referring to FIG. 3, the optical disc apparatus comprises a high-density optical disc 10, an optical pickup 20, an RF processing unit 30, a digital-signal processing unit 40, a controller 50, a servo unit 60, a motor driver 70, a key-input unit 80, and a memory 90. For purposes of brevity, the optical disc apparatus, albeit in whole or in part, can also be referred to as a drive system which can be internal (housed within a host) or external (housed in a separate box that connects to a host (not shown)). The optical disc can be any high-density medium, such as blue-ray disc (BD) and advanced optical disc (AOD); however, other optical discs can also be utilized, including DVD, DVD-R, DVD-RW, DVD+RW, DVD-RAM, DVD-ROM, CD, CD-R, CD-RW, and CD-ROM. In addition, such an optical disc apparatus may be a single apparatus, or may be separated into a recording apparatus (i.e., digital video disc recorder "DVDR") and a reading apparatus (i.e., compact disc player "CDP" or digital video disc player "DVDP").

The optical pick-up 20 performs optical pick-up from a writable or reproducible high-density optical disc 10 to write or read data on or from the high-density optical disc 10. In other words, the optical pick-up 20 is required for recording and reproducing data. When data is recorded, the optical pick-up 20 radiates a laser beam on the surface of an optical disc 10 to form a pit. When recorded data is reproduced, the optical pick-up 20 optically reads information on the pit formed on the optical disc 10 to output an electrical signal.

The RF processing unit 30 generates an RF signal by converting an electrical signal output from the optical pickup 20 into a waveform, and has an automatic laser power control function to optimize output of a laser diode (LD) of the high-density optical disc 10.

At this time, while moving on the OPC zone to detect the optical disc 10, the optical pickup 20 radiates a laser beam onto the optical disc 10 through the laser diode (LD), and outputs light to the RF processing unit 30 via a photodiode (PD) of the optical pickup 20 which receives the light reflected from the optical disc 10. The RF processing unit 30 receives the output from the photodiode (PD) of the optical pickup 20, and outputs an RECD signal for enabling a writable data on the OPC zone to be detected to the controller 50. The controller 50 can detect an erasing error on the erased test zone within the OPC zone on the basis of the RECD signal.

The digital-signal processing unit 40 modulates or demodulates the data when writing the data on the optical disc 10 by converting the RF signal reproduced from the RF processing unit 30 into a digital signal. The controller 50 controls the optical pickup 20, the RF processing unit 30, the digital-signal processing unit 40, and the servo unit 60, and applies focus servo and tracking servo on/off command to the servo unit 60.

The servo unit 60 generates a drive signal for focusing, tracking, and spindling the optical pickup 20 with reference to the RF signal reproduced from the RF processing unit 30 through control of the controller 50.

The motor driver 70 performs servo control to change a rotational speed of the high-density optical disc 10 and a location of the optical pickup 20 reading the data through control of the servo unit 60.

The key-input unit 80 is used to input signals into the controller 70 to open/close a disc tray, to turn on/off the optical disc apparatus, and to record, reproduce or erase on the high-density optical disc 10.

The memory 90 stores data required for operation of the controller 50, and includes parameters to perform the OPC.

Figure 4:
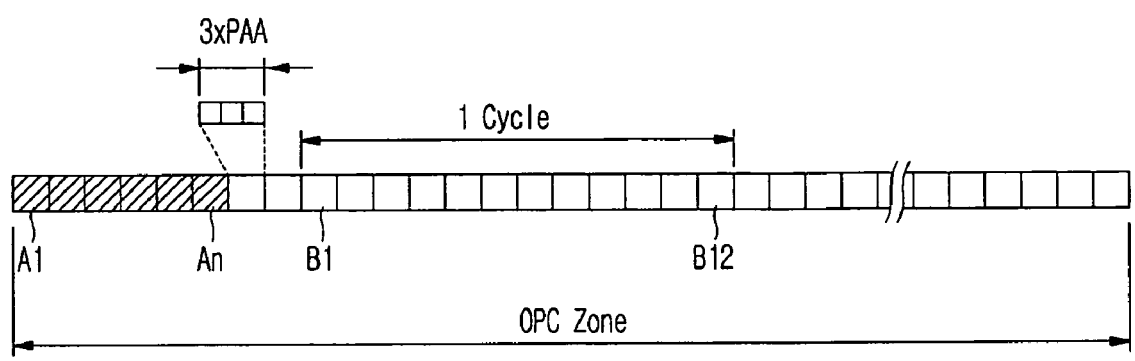
FIG. 4 is a view illustrating an example OPC zone on an optical disc, including the case where one cycle of test zone is secured thereon in accordance with the present invention.

The controller 50 secures one cycle of test zone B1~B12 to perform the OPC for the OPC zone, as shown in FIG. 4. The cycle of test zone comprises twelve (12) data blocks. Herein, one block consists of three PAA units. In addition, the OPC zone may further comprise blocks A1~An in which the data is previously written.

The controller 50 allows a specific pattern to be written on the test zone B1~B12 secured on the optical disc 10, and allows optimum writing power to be established according to a condition of the specific pattern obtained by reading the specific pattern written on the optical disc 10.

Meanwhile, when erasing the OPC zone in order to secure one cycle of test zone, an erasing error can arise on the OPC zone. In this regard, according to the present invention, when the erasing error arises on the OPC zone, a new test zone is re-established. As described below, in accordance with a first embodiment of the invention, the optical device apparatus, as shown in FIG. 3, is configured to skip one block from a block where the erasing error is detected, and to re-establish a new test zone therefrom, as will be described in connection with FIG. 5, FIG. 6 and FIG. 7 herein below. In accordance with a second embodiment of the invention, the optical device apparatus, as shown in FIG. 3, is configured to skip the remainder of blocks in one cycle of blocks when the erasing error is detected on one block in the cycle of blocks, and re-establish a test zone from a block in a new cycle of blocks, as will be described in connection with FIG. 8, FIG. 9 and FIG. 10 herein below.

Embodiment 1

Figure 5:
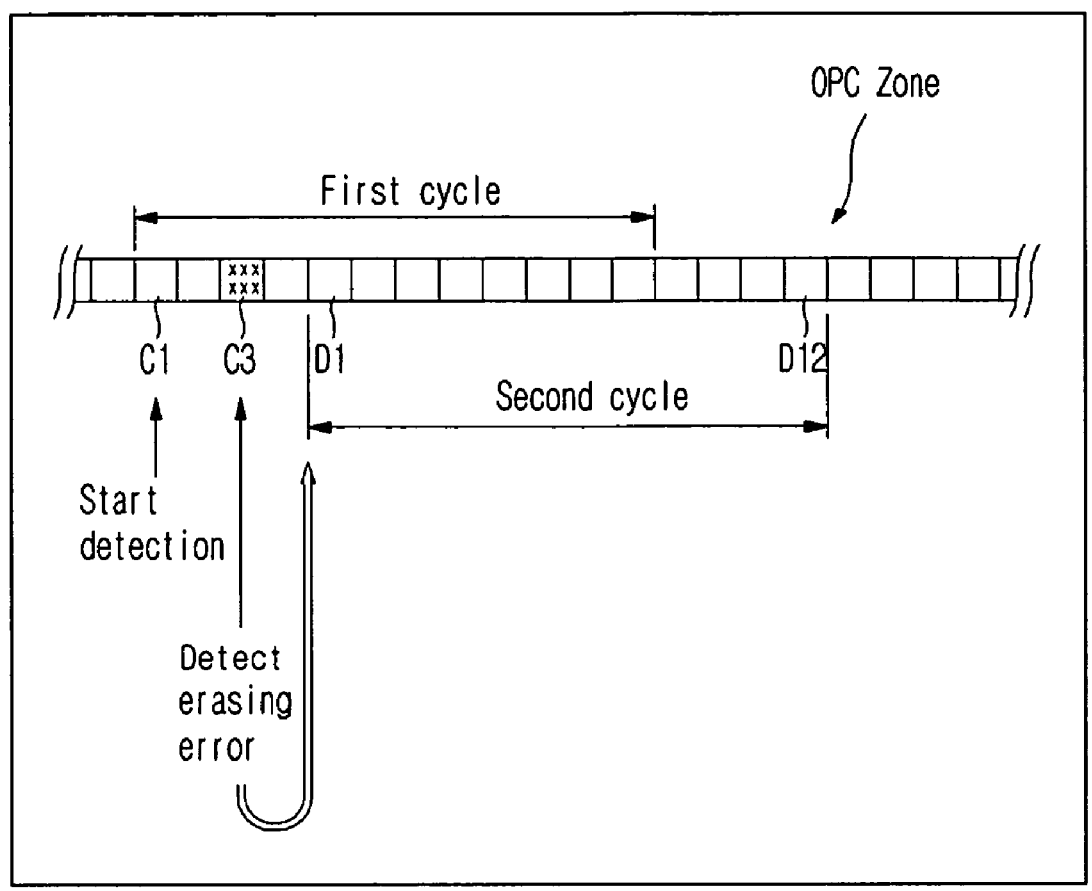
FIG. 5 is a view illustrating a process of re-establishing a test zone when an erasing error is detected in an initially established test zone using an optical disc apparatus in accordance with a first embodiment of the present invention.
Figure 6:
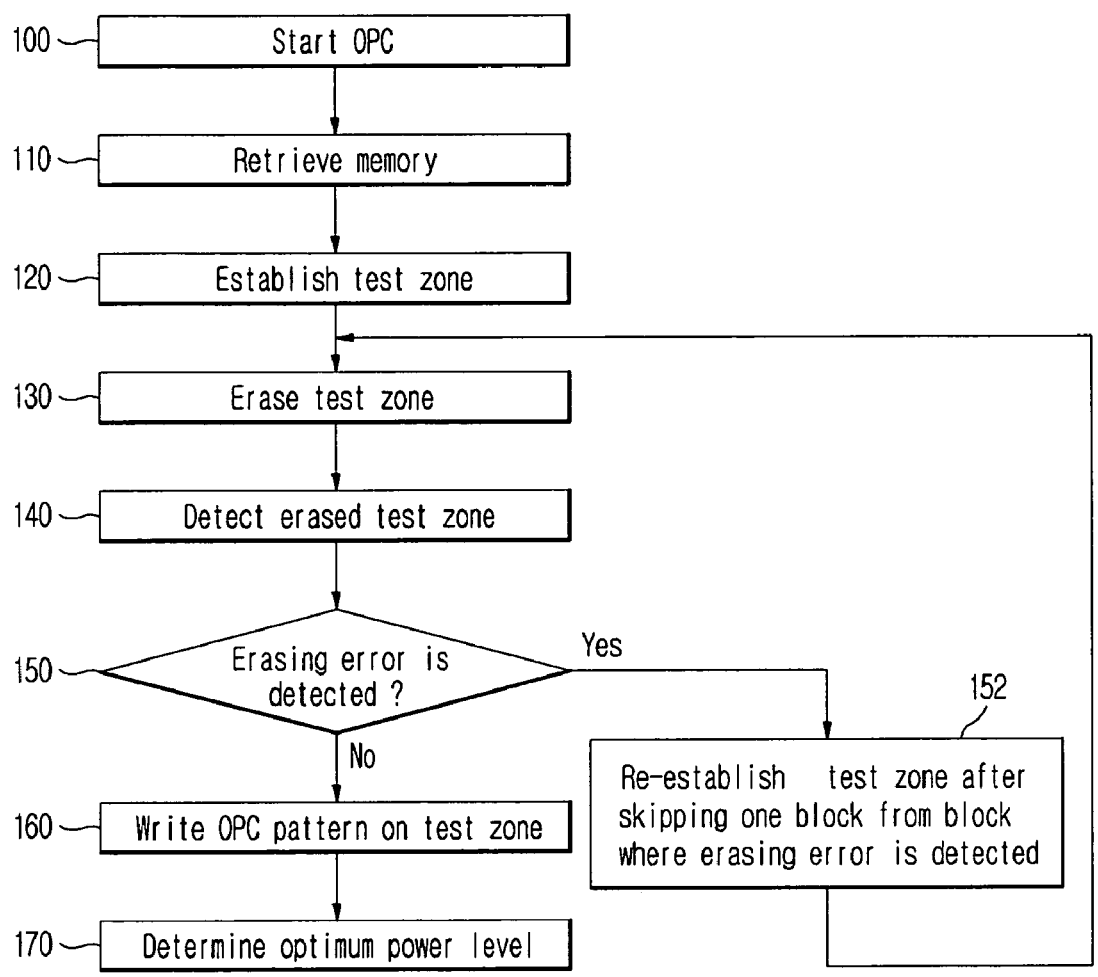
FIG. 6 is a flow diagram illustrating a method for controlling an optical disc apparatus to re-establish a test zone for OPC, as shown in FIG. 5.
Figure 7:
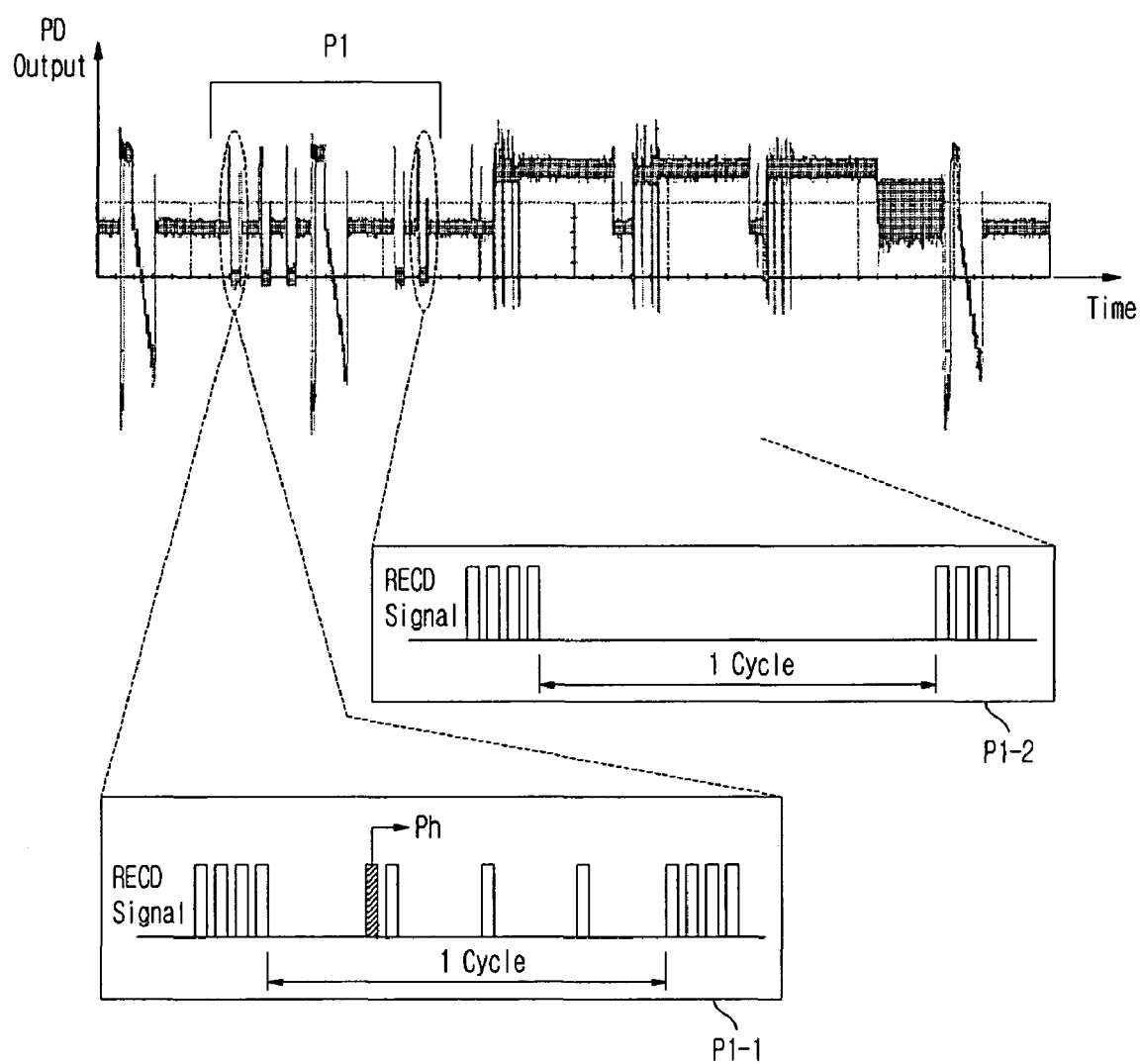
FIG. 7 is a diagram illustrating a result of a test for detecting a time for securing the test zone by the optical disc apparatus shown in FIG. 5.

Specifically, FIG. 5 illustrates a process of re-establishing a test zone when an erasing error is detected in an initially established test zone using an optical disc apparatus in accordance with a first embodiment of the present invention. FIG. 6 is a flow diagram illustrating a method for controlling an optical disc apparatus to re-establish a test zone for OPC, as shown in FIG. 5. FIG. 7 illustrates a test result of detecting a time for securing the test zone by the optical disc apparatus shown in FIG. 5.

As a preparatory procedure, when receiving a command to start OPC at step 100, as shown in FIG. 6, a controller 50 accesses a memory 90, and reads parameter information from the memory 90 to perform the OPC at block 110. Then, the controller 50 establishes a first cycle of twelve (12) blocks as a test zone on an OPC zone at step 120, and erases the test zone at step 130. As shown in FIG. 5, a test zone on the OPC zone is comprised of a plurality of blocks. After erasing the first cycle of blocks, the controller 50 controls the optical pickup 20, as shown in FIG. 3, to irradiate a laser beam to detect an erasing error located on a first block C1 in the first cycle of blocks. At this time, an RF processing unit 30 generates an RECD signal to detect the erasing error with reference to data read by the optical pickup 20, as shown in FIG. 7, and sends the RECD signal to the controller 50. The controller 50 detects whether the erasing error is present according to the RECD signal at step 140.

Such detection for the erasing error is separately performed on each of three PAA units constituting one block. In this manner, after detection of the erasing error on three PAA units of an associated block, the rest of the blocks are sequentially detected.

After detecting the erasing error on one block, the controller 50 determines whether the erasing error is detected therein at step 150. If the erasing error is detected on this block, for example, if the erasing error is detected on a third block C3 in the first cycle of blocks according to the result of detecting the third block C3, the controller 50 adds one block to the third block C3, as show in FIG. 5, and re-establishes a second cycle of twelve (12) blocks D1~D12 as a test zone from the added block at step 152. Thereafter, in order to detect whether the erasing error exists on the re-established test zone D1~D12, steps 130, 140 and 150 are repeated. The detection for the erasing error is repeated until the erasing error is no longer detected on every block of the test zone within the OPC zone, as shown in FIG. 5.

When the erasing error is not detected on every block of the re-established test zone, the controller 50 controls the optical pickup 20 to write a specific pattern on the test zone at step 160. Subsequently, the controller 50 controls the optical pickup 20 to read the specific pattern written on the re-established test zone, in order to determine an optimum power level according to the specific pattern read by the optical pickup 20 at step 170. According to the optimum power level determined in this manner, data is written on the optical disc 10.

When the test zone is re-established in accordance with the first embodiment, re-establishing of the test zone is also repeated in the case where an erasing error occurs in a zone P1 as shown in FIG. 7. In this regard, an RECD signal, which becomes a "High" level at a certain PAA unit on an erased test zone, for example, in a first detection section P1-1, is output from the RF processing unit 30 to the controller 50 as a detection signal Ph. Then, the controller 50 calculates an address of the associated PAA, and re-establishes a new test zone from a block obtained by adding one block to the block of this PAA, followed by repeating detection for the erasing error. After re-establishing a second detection section P1-2 in this manner, if a "High" level RECD signal on the erased test zone is not detected, the controller 50 determines that the erasing error does not exists on the re-established test zone. In other words, the controller 50 can secure the test zone without having the erasing error, and can determine the optimum power according to a condition of the specific pattern written on this test zone.

Embodiment 2

Figure 8:
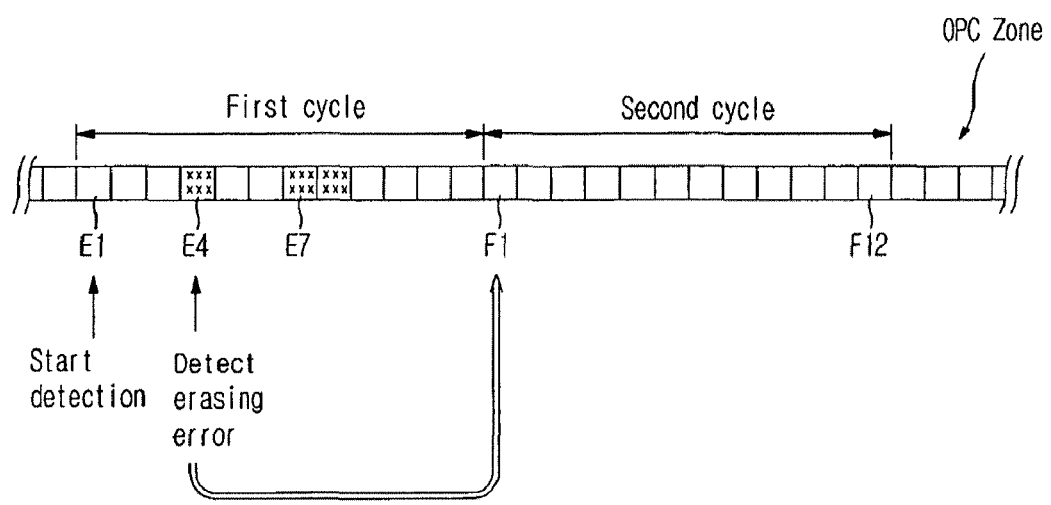
FIG. 8 is a view illustrating a process of re-establishing a test zone when an erasing error is detected in an initially established test zone using an optical disc apparatus in accordance with a second embodiment of the present invention.
Figure 9:
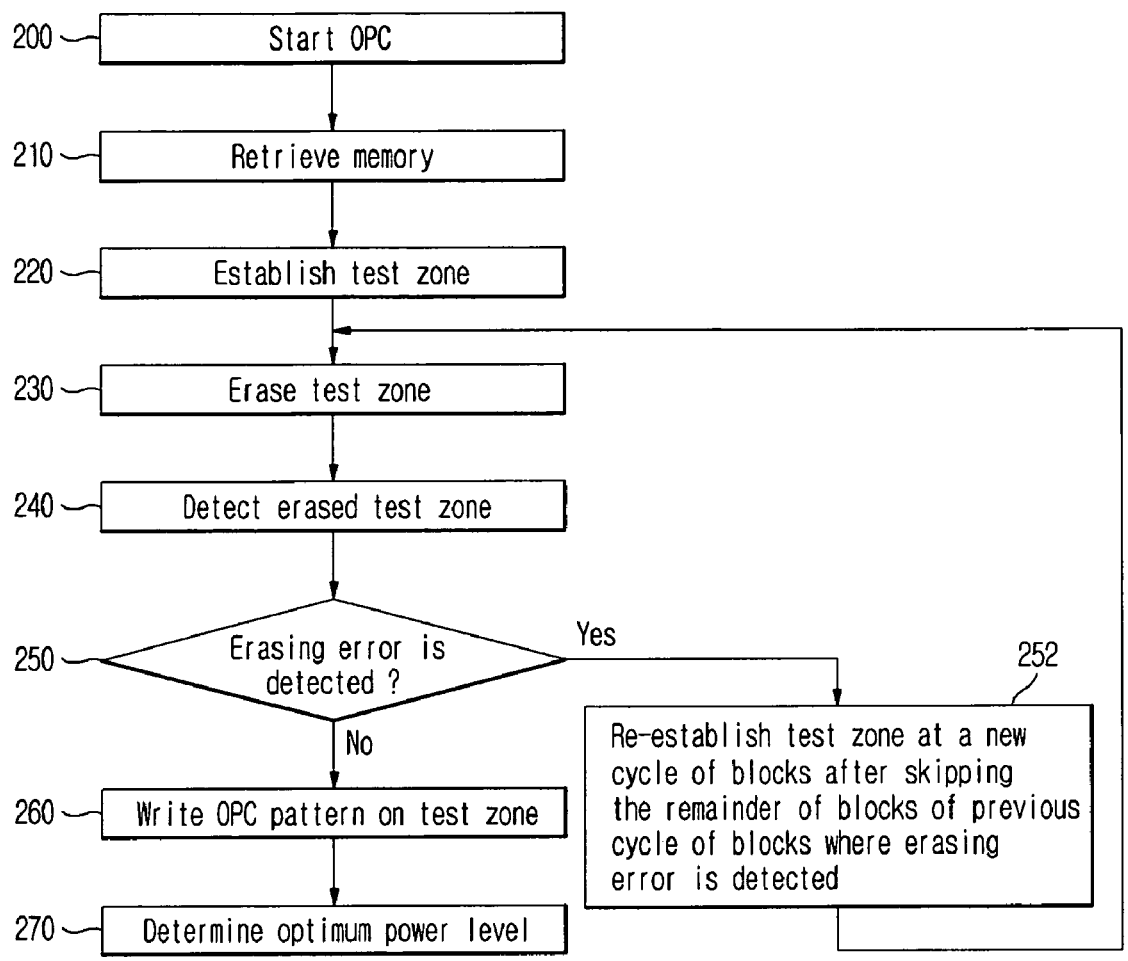
FIG. 9 is a flow diagram illustrating a method for controlling an optical disc apparatus to re-establish a test zone for OPC, as shown in FIG. 8.
Figure 10:
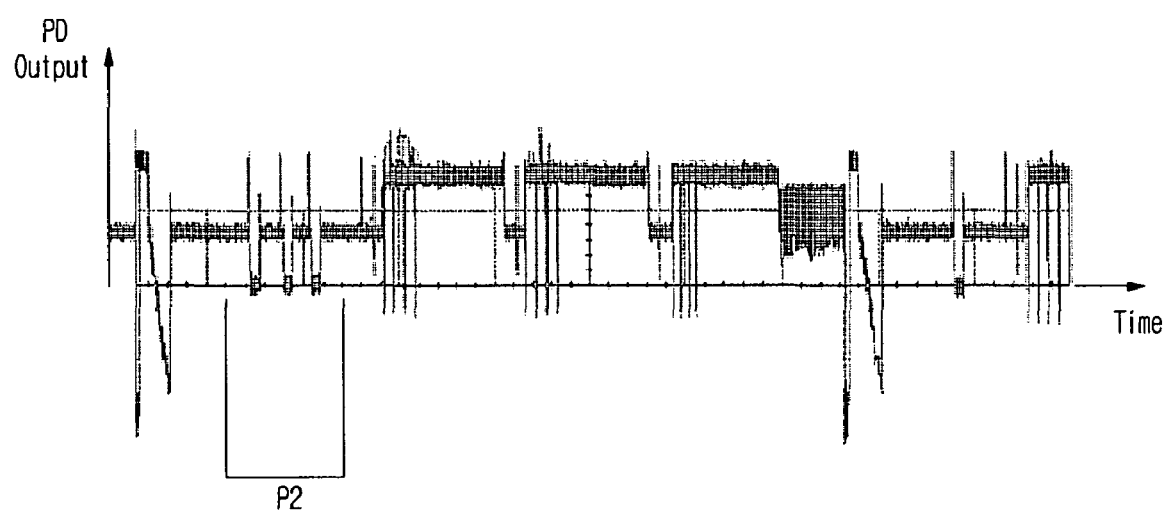
FIG. 10 is a diagram illustrating a result of a test for detecting a time for securing the test zone by the optical disc apparatus shown in FIG. 8.

Specifically, FIG. 8 illustrates a process of re-establishing a test zone when an erasing error is detected in an initially established test zone using an optical disc apparatus in accordance with a second embodiment of the present invention. FIG. 9 is a flow diagram illustrating a method for controlling an optical disc apparatus to re-establish a test zone for OPC, as shown in FIG. 8. FIG. 10 illustrates a test result of detecting a time for securing the test zone by the optical disc apparatus shown in FIG. 8.

As a preparatory procedure, when receiving a command to start OPC at step 200, as shown in FIG. 9, a controller 50 accesses a memory 90, and reads parameter information from the memory 90 to perform the OPC at step 210. Then, the controller 50 establishes a first cycle of twelve (12) blocks as a test zone on an OPC zone at step 220, and erases the test zone at step 230. As shown in FIG. 8, a test zone on the OPC zone is comprised of a plurality of blocks. After erasing the first cycle of blocks, the controller 50 controls the optical pickup 20, as shown in FIG. 3, to irradiate a laser beam to detect an erasing error located on a first block E1 in the first cycle of blocks. At this time, an RF processing unit 30 generates an RECD signal to detect the erasing error with reference to data read by the optical pickup 20, as shown in FIG. 10, and sends the RECD signal to the controller 50. The controller 50 detects whether the erasing error is present according to the RECD signal at step 240.

Such detection for the erasing error is separately performed on each of three PAA units constituting one block. In this manner, after detection of the erasing error on three PAA units of an associated block, the rest of the blocks are sequentially detected.

After detecting the erasing error on one block, the controller 50 determines whether the erasing error is detected therein at step 250. If the erasing error is detected on this block, for example, if the erasing error is detected on a fourth block E4 in the first cycle of blocks according to the result of detecting the fourth block E4, the controller 50 skips the remainder of the blocks in the first cycle of blocks, and re-establishes a second cycle of twelve blocks F1~F12 therefrom at step 252. Then, in order to detect whether the erasing error exists on the re-established test zone F1~F12, steps 230, 240 and 250 are repeated. The detection for the erasing error is repeated until the erasing error is no longer detected on every block of the test zone within the OPC zone, as shown in FIG. 8.

When the erasing error is not detected on every block of the re-established test zone, the controller 50 controls the optical pickup 20 to write a specific pattern on the re-established test zone at step 260. Subsequently, the controller 50 controls the optical pickup 20 to read the specific pattern written on the test zone, in order to determine an optimum power level according to the specific pattern read by the optical pickup 20 at step 270. According to the optimum power level determined in this manner, data is written on the optical disc 10.

When the test zone is re-established in accordance with the second embodiment, an erasing error is detected on the erased test zone in a zone P2 as shown in FIG. 10. As a result, if a "High" level RECD signal is output, the controller 50 re-establishes a new test zone from a new cycle of blocks after skipping the remainder of the blocks in the previous cycle of blocks, one of which has the erasing error. If the "High" level RECD signal is not output after detecting the erasing error on the erased test zone, the controller 50 determines that no erasing error is present in the re-established test zone. Then, the controller 50 allows the optical pickup 20 to write a specific pattern on the re-established test zone, and determines optimum power according to a condition of the specific pattern on this test zone.

The optical disc apparatus according to the first embodiment is suitable for the situation in which the erasing error exists in a narrow range on an initially established test zone, and the optical disc apparatus according to the second embodiment is suitable for the situation in which the erasing error exists in a wide range on the initially established test zone.

As described in the foregoing, the present invention advantageously ensures that the OPC is performed quickly and reliably, particularly, when an erasing error is detected on a test zone of an OPC zone. A new test zone is re-established at a location on the OPC zone after skipping the test zone where the erasing error is detected, so that OPC is performed rapidly while reducing an error frequency occurring when optimum writing power is not determined.

While the present invention has been particularly shown and described with reference to exemplary embodiments thereof, it will be understood by those of ordinary skill in the art that various changes in form and details may be made therein without departing from the spirit and scope of the present invention. For example, other recording media, such as DVD, DVD-R, DVD-RW, DVD+RW, DVD-RAM, DVD-ROM, CD, CD-R, CD-RW, CD-ROM and other holographic data storage devices may be utilized, as long as the OPC is implemented in the manner as described with reference to FIG. 5, FIG. 6, FIG. 7, FIG. 8, FIG. 9 and FIG. 10. In addition, the test zone can be fixed and/or flexible in designated areas of an optical disc. Similarly, the system controller can be implemented as a chipset having firmware, or alternatively, a general or special purposed computer programmed to implement methods as described with reference to FIG. 6 and FIG. 8. Accordingly, it is intended, therefore, that the present invention not be limited to the various example embodiments disclosed, but that the present invention includes all embodiments falling within the scope of the appended claims.

What is claimed is:

1. An optical disc apparatus capable of performing optimum power control (OPC) to determine optimum laser power suitable for recording data on an optical disc, comprising:
   an optical pickup to irradiate a laser beam onto an optical disc for erasing, recording and reproducing data; and
   a controller to control the optical pickup to perform optimum power control (OPC) to determine an optimum laser power suitable for recording data on the optical disc,
   wherein the controller re-establishes a new test zone when an erasing error is detected in an initially established and erased test zone prior to performing the OPC on the optical disc.

2. The apparatus according to claim 1, wherein the controller reestablishes the new test zone on an area excluding the initially established and erased test zone where the erasing error has been detected.

3. The apparatus according to claim 2, wherein, when an OPC zone is provided in a lead-in area of the optical disc, the controller re-establishes the new test zone in the OPC zone.

4. The apparatus according to claim 2, wherein the test zones comprise a plurality of blocks, and the controller re-establishes the new test zone after skipping a predetermined number of blocks from a block where the erasing error is detected in the initially established and erased test zone.

5. The apparatus according to claim 4, wherein the predetermined number of blocks is one.

6. The apparatus according to claim 2, wherein the test zones comprise a plurality of blocks, and the controller prevents blocks of the re-established new test zone from overlapping with blocks of the initially established and erased test zone.

7. The apparatus according to claim 1, wherein the controller repeats re-establishment of the new test zone until the erasing error is no longer detected.

8. A method of performing optimum power control (OPC) to determine an optimum laser power suitable for an optical disc, comprising:
   initially establishing a test zone to perform the OPC on the optical disc;
   erasing the initially established test zone;
   detecting whether an erasing error exists on the initially established and erased test zone;
   when the erasing error exists on the initially established and erased test zone, re-establishing a new test zone;
   erasing the re-established new test zone; and
   if the erasing error does not exist on the re-established and erased new test zone, determining the optimum laser power of the optical disc on the basis of a result of reading a specific pattern written on the re-established and erased new test zone.

9. The method according to claim 8, wherein re-establishing of the new test zone comprises excluding the initially established and erased test zone where the erasing error has been detected.

10. The method according to claim 8, wherein the new test zone is reestablished after skipping a predetermined number of blocks from a block where the erasing error has been detected in the initially established and erased test zone.

11. The method according to claim 8, wherein re-establishing of the new test zone is performed to prevent a block of the re-established test zone from overlapping with a block of the initially established and erased test zone.

12. The method according to claim 8, wherein re-establishing of the new test zone comprises repeating re-establishment of the new test zone until the erasing error is no longer detected on either the initially established and erased test zone or the re-established and erased new test zone.

13. An apparatus comprising:
   an optical pickup to irradiate a laser beam onto an optical disc to record and reproduce data;
   a memory to store parameters to perform optimum power control (OPC);
   a controller arranged to control the optical pickup and to access the memory to perform optimum power control (OPC), wherein the controller is configured to:
   initially establish a test zone to perform the OPC on the optical disc;
   erase the initially established test zone;
   determine whether an erasing error exists on the initially established test zone, and if the erasing error exists on the initially established and erased test zone, re-establish a new test zone;
   erase the re-established new test zone; and
   if the erasing error does not exist on the re-established and erased new test zone, record a specific OPC pattern on the re-established new test zone on the optical disc for a subsequent determination of an optimum laser power suitable to record data on the optical disc.

14. The apparatus according to claim 13, wherein, when an OPC zone is provided in a lead-in area of the optical disc, the controller establishes the initially established test zone in the OPC zone.

15. The apparatus according to claim 14, wherein the control reestablishes the new test zone on an area within the OPC zone, excluding the initially established and erased test zone where the erasing error has been detected.

16. The apparatus according to claim 13, wherein the test zones comprise a plurality of blocks, and the controller re-establishes the new test zone after skipping a predetermined number of blocks from a block where the erasing error has been detected on the initially established and erased test zone.

17. The apparatus according to claim 13, wherein the test zones comprise a plurality of blocks, and the controller prevents blocks of the re-established new test zone from overlapping with blocks of the initially established and erased test zone.

18. The apparatus according to claim 13, wherein the controller repeats the re-establishment of the new test zone until the erasing error is no longer detected on either the initially established and erased test zone or the re-established and erased new test zone.

19. A method of performing optimum power control (OP) in an optical disc apparatus, comprising:
  initially establishing a test zone to perform the OPC on the optical disc;
  erasing the initially established test zone;
  determining whether an erasing error exists on the initially established and erased test zone, and if the erasing error exists on the initially established and erased test zone, re-establish a new test zone;
  erasing the re-established new test zone; and
  if the erasing error does not exist on the re-established and erased new test zone, recording a specific OPC pattern on the re-established new test zone on the optical disc for a subsequent determination of an optimum laser power suitable to record data on the optical disc.

20. The method according to claim 19, wherein, when an OPC zone is provided in a lead-in area of the optical disc, the controller establishes the initially established test zone and the re-established new test zone in the OPC zone, and re-establishes the new test zone on an area within the OPC zone that excludes the initially established and erased test zone where the erasing error has been detected.

21. The method according to claim 19, wherein the test zones comprise a plurality of blocks, and the new test zone is re-established by skipping a predetermined number of blocks from a block where the erasing error has been detected on the initially established and erased test zone.

22. The method according to claim 19, wherein the test zones comprise a plurality of blocks, and blocks of the re-established new test zone are prevented from overlapping with blocks of the initially established and erased test zone.

23. The method according to claim 19, wherein the re-establishment of the new test zone is repeated until the erasing error is no longer detected on either the initially established and erased test zone or the re-established and erased new test zone.

24. The method according to claim 19, wherein, when an OPC zone is provided in a lead-in area of the optical disc, the controller establishes the initially established test zone in a designated area of the OPC zone, and if the erasing error is detected in the designated area, re-establishes the new test zone in another area of the OPC zone.

25. An optical disc apparatus capable of performing optimum power control (OPC) to determine optimum laser power suitable to record data on an optical disc, comprising:
  an optical pickup to irradiate a laser beam onto an optical disc to perform erasing, recording or reproducing data with respect to the optical disc; and
  a controller to control the optical pickup, to initially establish a first test zone of the optical disc, to erase the initially established first test zone, to detect a signal from the initially established and erased first test zone, and to determine whether to re-establish a second test zone without performing an optimum power control (OPC) or whether to perform the optimum power control on the initially established and erased first test zone, according to the detected signal.

26. The optical disc apparatus of claim 25, wherein the controller detects an erasing error as the signal indicating that the initially established and erased first test zone includes at least one erasing error before performing the OPC.

27. The optical disc apparatus of claim 25, wherein the controller detects the signal from the initially established and erased first test zone without recording the initially established and erased first test zone.

28. The optical disc apparatus of claim 25, wherein the controller reestablishes the second test zone, erases the reestablished second test zone, to detect a second signal from the re-established and erased second test zone, and to determine whether to perform the optimum power control on the reestablished second test zone.

29. The optical disc apparatus of claim 25, wherein the controller determines to perform the optimum power control on the initially established and erased first test zone, according to the detected signal detected without performing the recording on the initially established and erased first test zone.

30. The optical disc apparatus of claim 25, wherein the signal is detected from the initially established and erased first test zone without performing the recording on the initially established and erased first test zone.

31. A method offer performing optimum power control (OPC) to determine an optimum laser power suitable for an optical disc, comprising:
  initially establishing a first test zone of the optical disc;
  erasing the initially established first test zone;
  detecting a signal from the initially established and erased first test zone; and
  determining whether to re-establish a second test zone without performing an optimum power control (OPC) or performing the optimum power control on the initially established and erased first test zone, according to the detected signal.

* * * * *